US012776568B2

(12) United States Patent
Gouchi et al.

(10) Patent No.: US 12,776,568 B2
(45) Date of Patent: Oct. 27, 2026

(54) ANTENNA MODULE AND COMMUNICATION DEVICE EQUIPPED WITH THE ANTENNA MODULE

(71) Applicant: Murata Manufacturing Co., Ltd., Nagaokakyo (JP)

(72) Inventors: Naoki Gouchi, Nagaokakyo (JP); Ryo Komura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 153 days.

(21) Appl. No.: 18/536,241

(22) Filed: Dec. 12, 2023

(65) Prior Publication Data

US 2024/0106106 A1 Mar. 28, 2024

Related U.S. Application Data

(63) Continuation of application No. PCT/JP2022/023144, filed on Jun. 8, 2022.

(30) Foreign Application Priority Data

Jun. 15, 2021 (JP) ................................ 2021-099440

(51) Int. Cl.
*H01Q 13/08* (2006.01)
*H01Q 1/24* (2006.01)
(Continued)

(52) U.S. Cl.
CPC ............. *H01Q 1/243* (2013.01); *H01Q 9/045* (2013.01); *H01Q 21/0006* (2013.01); *H01Q 21/24* (2013.01)

(58) Field of Classification Search
CPC .... H01Q 1/243; H01Q 9/045; H01Q 21/0006; H01Q 21/24; H01Q 21/065
See application file for complete search history.

(56) References Cited

U.S. PATENT DOCUMENTS 4,835,538 A * 5/1989 McKenna ............ H01Q 9/0414 343/700 MS
5,448,252 A * 9/1995 Ali ........................ H01Q 9/0407 333/237
(Continued)

FOREIGN PATENT DOCUMENTS

CN 105390809 A * 3/2016 ............... H01Q 1/36
JP 2000-138525 A 5/2000
(Continued)

OTHER PUBLICATIONS

International Search Report and Written Opinion mailed on Aug. 16, 2022, received for PCT Application PCT/JP2022/023144, filed on Jun. 8, 2022, 8 pages including English Translation.

*Primary Examiner* — Dimary S Lopez Cruz
*Assistant Examiner* — Bamidele A Immanuel
(74) *Attorney, Agent, or Firm* — XSENSUS LLP

(57) ABSTRACT

An antenna module has a substrate, a radiating element disposed in or on the substrate, a power feeding line, and a dielectric body. The substrate has a rectangular shape including first and second sides adjacent to each other. The power feeding line extends in a normal direction of the substrate and transfers radio frequency signals supplied from an RFIC to the radiating element. The dielectric body is disposed on a side surface of the substrate. The power feeding line is coupled to the radiating element at a position offset from the center of the radiating element in a first direction toward the first side. The dielectric body is disposed so as to cover the side surface of the substrate including the first side. The dielectric constant of the dielectric body is higher than the dielectric constant of the substrate.

20 Claims, 11 Drawing Sheets

(51) Int. Cl.

| | |
|---|---|
| ***H01Q 9/04*** | (2006.01) |
| ***H01Q 21/00*** | (2006.01) |
| ***H01Q 21/24*** | (2006.01) |

(56) References Cited

U.S. PATENT DOCUMENTS

| | | | | |
|---|---|---|---|---|
| 6,800,929 | B1 * | 10/2004 | Nishijima | H10W 20/497 257/664 |
| 2010/0289707 | A1 * | 11/2010 | Takamura | H01Q 1/38 343/702 |
| 2013/0002514 | A1 * | 1/2013 | Ziolkowski | H01Q 1/286 343/872 |
| 2013/0127560 | A1 * | 5/2013 | Kato | H01P 3/003 333/12 |
| 2014/0159976 | A1 * | 6/2014 | de Rochemont | H01Q 7/00 343/793 |
| 2015/0084814 | A1 * | 3/2015 | Rojanski | H01Q 21/065 342/368 |
| 2015/0194730 | A1 * | 7/2015 | Sudo | H01Q 5/378 343/905 |
| 2017/0222316 | A1 * | 8/2017 | Mizunuma | H01Q 1/526 |
| 2019/0067223 | A1 * | 2/2019 | Lachner | H01L 24/12 |
| 2019/0165473 | A1 * | 5/2019 | Yun | H01Q 21/062 |
| 2019/0319367 | A1 * | 10/2019 | Edwards | H01Q 3/2605 |
| 2019/0326672 | A1 * | 10/2019 | Lim | H01Q 19/30 |
| 2019/0393613 | A1 * | 12/2019 | Kakuya | H01Q 9/045 |
| 2020/0083593 | A1 * | 3/2020 | Choi | H01Q 5/10 |
| 2020/0091583 | A1 * | 3/2020 | Choi | H01Q 1/243 |
| 2020/0136255 | A1 * | 4/2020 | Choi | H01Q 1/38 |
| 2020/0161749 | A1 * | 5/2020 | Onaka | H01Q 21/24 |
| 2020/0185836 | A1 * | 6/2020 | Wang | H01Q 1/364 |
| 2020/0287298 | A1 * | 9/2020 | Ueda | H01Q 9/0407 |
| 2020/0313279 | A1 * | 10/2020 | Kim | H01Q 21/08 |
| 2020/0388912 | A1 * | 12/2020 | Sudo | H01Q 1/2283 |
| 2021/0036407 | A1 * | 2/2021 | Kim | H01Q 21/28 |
| 2021/0036414 | A1 * | 2/2021 | Takayama | H01Q 1/40 |
| 2021/0036736 | A1 * | 2/2021 | Uchimura | H01Q 15/0026 |
| 2021/0057820 | A1 * | 2/2021 | Sudo | H01Q 1/2283 |
| 2021/0075099 | A1 * | 3/2021 | Soga | H01Q 21/065 |
| 2021/0083380 | A1 * | 3/2021 | Takayama | H01Q 5/28 |
| 2021/0135364 | A1 * | 5/2021 | Yamada | H01Q 1/243 |
| 2021/0184344 | A1 * | 6/2021 | Furuhi | H01Q 21/065 |
| 2022/0216605 | A1 * | 7/2022 | Yamada | H01Q 19/185 |
| 2022/0302581 | A1 * | 9/2022 | Sunamoto | B32B 17/1022 |
| 2023/0006350 | A1 * | 1/2023 | Arai | H01Q 1/2283 |

FOREIGN PATENT DOCUMENTS

| | | | |
|---|---|---|---|
| JP | 3683422 | B2 * | 8/2005 |
| JP | 2008-098919 | A | 4/2008 |

* cited by examiner

ANTENNA MODULE AND COMMUNICATION DEVICE EQUIPPED WITH THE ANTENNA MODULE

CROSS-REFERENCE TO RELATED APPLICATIONS

This is a continuation application of PCT/JP2022/023144, filed on Jun. 8, 2022, designating the United States of America, which is based on and claims priority to Japanese Patent Application No. JP 2021-099440 filed on Jun. 15, 2021. The entire contents of the above-identified applications, including the specifications, drawings and claims, are incorporated herein by reference in their entirety.

TECHNICAL FIELD

The present disclosure relates to an antenna module and a communication device equipped with the antenna module, and more specifically, to techniques for improving antenna characteristics in the antenna module.

BACKGROUND ART

Japanese Unexamined Patent Application Publication No. 2008-98919 (Patent Document 1) discloses a configuration of an array antenna device using a planar antenna as an antenna element in which a slit is formed in the ground electrode (ground plate) between two antenna elements and a plurality of through holes are disposed in a row along the slit in a dielectric substrate.

In the array antenna device disclosed in Japanese Unexamined Patent Application Publication No. 2008-98919 (Patent Document 1), surface currents propagating between antenna elements can be interrupted and the amount of mutual coupling can be reduced by setting a dimension of a slit spacing in which a wavelength of the surface current to be interrupted does not propagate.

CITATION LIST

Patent Document

Patent Document 1: Japanese Unexamined Patent Application Publication No. 2008-98919

SUMMARY

Technical Problem

Antenna devices such as those described above may be used, for example, in portable terminals such as smartphones or cellular phones. In addition to the demand for smaller and thinner devices, there is a need for improved antenna characteristics such as pass band width and gain in portable terminals.

The present disclosure is made to solve the above problem, and an object of the present disclosure is to improve antenna gain and directivity in an antenna module using a planar antenna.

Solution to Problem

An antenna module according to an aspect of the present disclosure has a dielectric substrate, a first radiating element disposed in or on the dielectric substrate, a first power feeding line, and a first dielectric body. The dielectric substrate has a rectangular shape including a first side and a second side adjacent to each other. The first power feeding line extends in a normal direction of the dielectric substrate and transfers a radio frequency signal supplied from a power feed circuit to the first radiating element. The first dielectric body is disposed on a side surface of the dielectric substrate. The first power feeding line is coupled to the first radiating element at a position offset from the center of the first radiating element in a first direction toward the first side. The first dielectric body is disposed so as to cover the side surface including the first side of the dielectric substrate. The dielectric constant of the first dielectric body is higher than the dielectric constant of the dielectric substrate.

An antenna module according to another aspect of the present disclosure has a support substrate, a plurality of subarrays disposed on the support substrate, and a dielectric body covering the plurality of subarrays. Each of the plurality of subarrays includes a dielectric substrate having a rectangular shape having a first side to a fourth side, and a first radiating element to a fourth radiating element that are disposed in or on the dielectric substrate. The second and fourth sides extend in a first direction, and the first and third sides extend in a second direction orthogonal to the first direction. The first and second radiating elements are disposed adjacent to each other in the first direction along the second side, and the first and third radiating elements are disposed adjacent to each other in the second direction along the first side. The second and fourth radiating elements are disposed adjacent to each other in the first direction along the fourth side, and the third and fourth radiating elements are disposed adjacent to each other in the second direction along the third side. In each of the first to fourth radiating elements, a radio frequency signal is provided to a position offset from the center of the radiating element in the direction of the side in the proximity in the dielectric substrate. The dielectric body includes a first dielectric body disposed so as to cover the side surface including the first to fourth sides in each of the plurality of subarrays and a second dielectric body disposed so as to cover the first to fourth radiating elements when viewed in plan in a normal direction of the dielectric substrate. The dielectric constant of the dielectric body is higher than the dielectric constant of the dielectric substrate.

Advantageous Effects

In the antenna module of the present disclosure, a dielectric body having a dielectric constant higher than the dielectric constant of the dielectric substrate is disposed so as to cover the side surface of the dielectric substrate in or on which the radiating element is disposed, the side surface being in the proximity of the power feeding line. With this configuration, an electric field from the radiating element is guided by the dielectric body in the direction of radio wave radiation (i.e., normal direction of the radiating element). This strengthens the gain in the direction of radio wave radiation, thereby improving the directivity of the antenna gain.

DESCRIPTION OF EMBODIMENTS

The following is a detailed description of the embodiments of the present disclosure with reference to the drawings. The same or equivalent parts in the figures are marked with the same reference signs, and the descriptions thereof are omitted.

Embodiment 1

(Basic Configuration of Communication Device)

Figure 1:
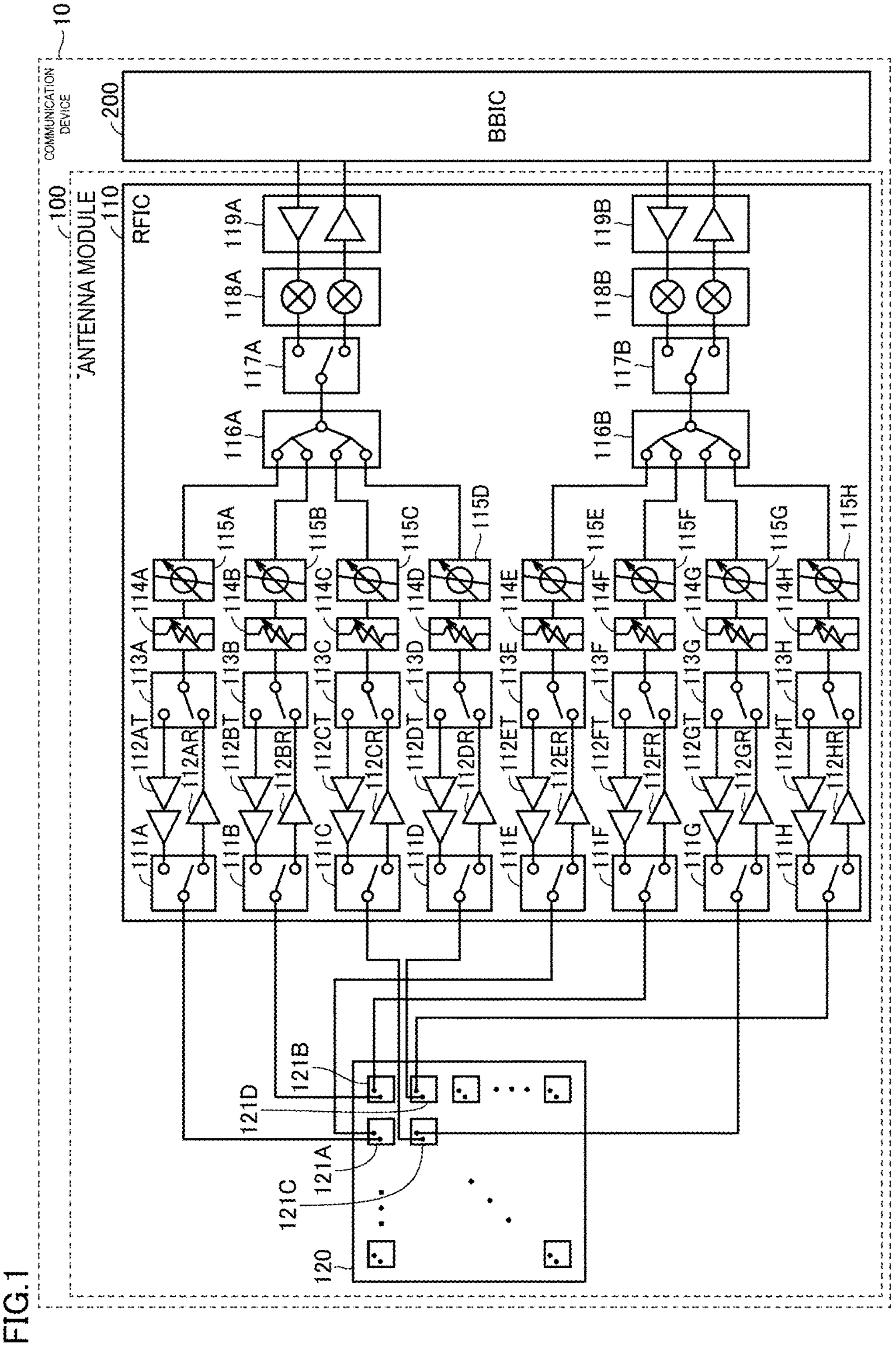
FIG. 1 is a block diagram of a communication device equipped with an antenna module according to Embodiment 1.

FIG. 1 is an example of a block diagram of a communication device 10 to which an antenna module 100 according to Embodiment 1 is applied. The communication device 10 is, for example, a portable terminal such as a cellular phone, a smartphone or a tablet, or a personal computer provided with communication functions. An example of a frequency band of radio waves used for the antenna module 100 according to the Embodiment 1 is, for example, a millimeter wave band of radio waves with a center frequency of 28 GHz, 39 GHz, 60 GHz, and the like. However, frequency bands of radio waves other than the above can also be applied.

Referring to FIG. 1, the communication device 10 has the antenna module 100 and a BBIC 200 that constitutes a baseband signal processing circuit. The antenna module 100 has an RFIC 110, which is an example of a power feed circuit, and an antenna device 120. The communication device 10 up-converts signals transferred from the BBIC 200 to the antenna module 100 to radio frequency signals at the RFIC 110 and radiates the radio frequency signals from the antenna device 120. The communication device 10 also transmits the radio frequency signals received at the antenna device 120 to the RFIC 110, down-converts the radio frequency signals, and processes the signals at the BBIC 200.

In FIG. 1, for ease of explanation, among a plurality of radiating elements (feeding elements) constituting the antenna device 120, a configuration corresponding to four radiating elements 121A to 121D (hereinafter also comprehensively referred to as “radiating elements 121”) is illustrated. Configurations corresponding to other radiating elements having similar configurations are omitted. Although FIG. 1 illustrates an example in which the antenna device 120 is formed of a plurality of radiating elements 121 disposed in a two-dimensional array, the antenna device 120 may be a one-dimensional array in which the plurality of radiating elements 121 are disposed in a single row. The antenna device 120 may also be configured with a single radiating element 121. In the present embodiment, the radiating element 121 is a patch antenna having a flat plate shape.

The antenna device 120 is a so-called dual-polarization type antenna device that can radiate two radio waves with different polarization directions from a single radiating element. Each radiating element 121 is supplied with a radio frequency signal for a first polarized wave and a radio frequency signal for a second polarized wave from the RFIC 100.

The RFIC 110 has switches 111A to 111H, switches 113A to 113H, switches 117A and 117B, power amplifiers 112AT to 112HT, low-noise amplifiers 112AR to 112HR, attenuators 114A to 114H, phase shifters 115A to 115H, a signal multiplexer/demultiplexer 116A, a signal multiplexer/demultiplexer 116B, mixers 118A and 118B, and amplifier circuits 119A and 119B. Among these, the configuration of the switches 111A to 111D, the switches 113A to 113D, the switch 117A, the power amplifiers 112AT to 112DT, the low-noise amplifiers 112AR to 112DR, the attenuators 114A to 114D, the phase shifters 115A to 115D, the signal multiplexer/demultiplexer 116A, the mixer 118A, and the amplifier circuit 119A forms a circuit for radio frequency signals for the first polarized wave. In addition, the configuration of the switches 111E to 111H, the switches 113E to 113H, the switch 117B, the power amplifiers 112ET to 112HT, the low-noise amplifiers 112ER to 112HR, the attenuators 114E to 114H, the phase shifters 115E to 115H, the signal multiplexer/demultiplexer 116B, the mixer 118B, and the amplifier circuit 119B forms a circuit for radio frequency signals for the second polarized wave.

Based on radio frequency signals being transmitted, the switches 111A to 111H and the switches 113A to 113H are switched to the power amplifiers 112AT to 112HT side, and the switches 117A and 117B are connected to the transmission-side amplifiers of the amplifier circuits 119A and 119B. Based on radio frequency signals being received, the switches 111A to 111H and the switches 113A to 113H are switched to the low-noise amplifiers 112AR to 112HR side, and the switches 117A and 117B are connected to the reception-side amplifiers of the amplifier circuits 119A and 119B.

The signals transferred from the BBIC 200 are amplified by the amplifier circuits 119A and 119B, and up-converted by the mixers 118A and 118B. The transmission signals, which are up-converted radio frequency signals, are quadrupled by the signal multiplexer/demultiplexer 116A and the signal multiplexer/demultiplexer 116B, and pass through corresponding signal paths to feed different radiating elements 121. The directivity of the antenna device 120 can be adjusted by individually adjusting the phase shifting degree of the phase shifters 115A to 115H disposed in each signal path. The attenuators 114A to 114H also adjust the strength of the transmission signal.

The radio frequency signals from the switches 111A and 111E are fed to the radiating element 121A. Similarly, the radio frequency signals from the switches 111B and 111F are supplied to the radiating element 121B. The radio frequency signals from the switches 111C and 111G are supplied to the radiating element 121C. The radio frequency signals from the switches 111D and 111H are supplied to the radiating element 121D.

The reception signals, which are radio frequency signals received at each radiating element 121, are transferred to the RFIC 110 and combined at the signal multiplexer/demultiplexer 116A and the signal multiplexer/demultiplexer 116B via four different signal paths. The combined reception signals are down-converted by the mixers 118A and 118B, amplified by the amplifier circuits 119A and 119B, and transferred to the BBIC 200.

(Configuration of Antenna Module)

Figure 2:
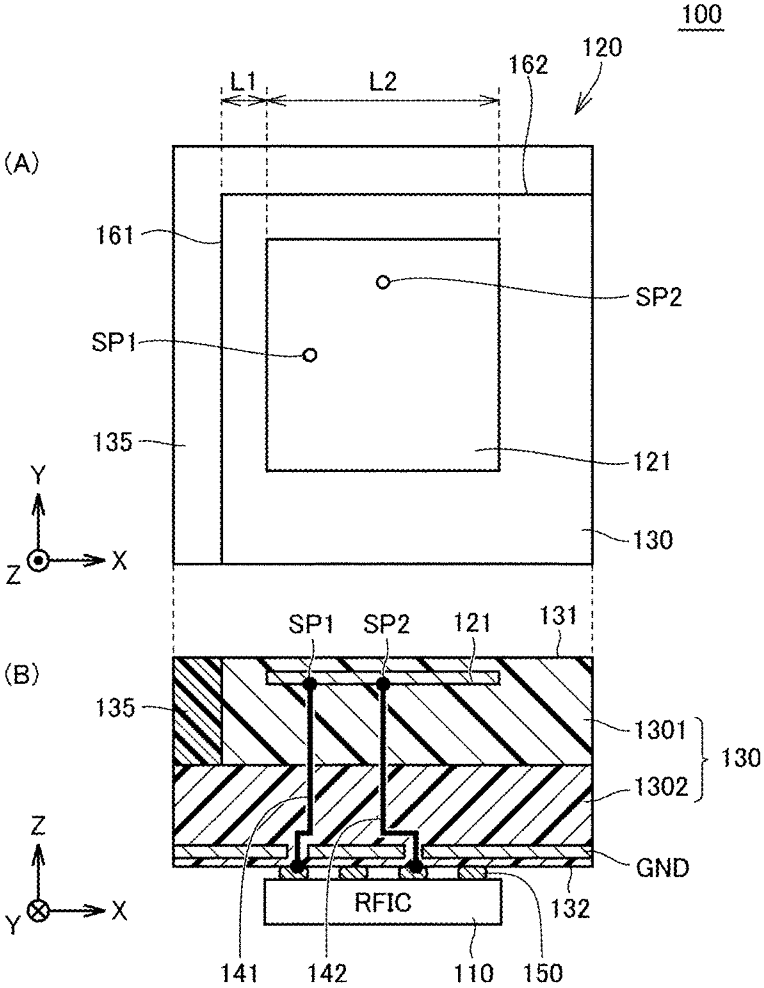
FIG. 2 illustrates a plan view and a sectional perspective view of the antenna module according to Embodiment 1.

Next, FIG. 2 is used to explain the details of the configuration of the antenna module 100 according to the Embodiment 1. FIG. 2 illustrates the antenna module 100 according to Embodiment 1. In FIG. 2, a plan view (FIG. 2(A)) of the antenna module 100 is illustrated in the upper panel, and a sectional perspective view (FIG. 2(B)) is illustrated in the lower panel.

In FIG. 2, for ease of explanation, a configuration with one radiating element 121 is used as an example.

In addition to the radiating element 121 and the RFIC 110, the antenna module 100 includes a dielectric substrate 130, a dielectric body 135, power feeding lines 141 and 142, and a ground electrode GND. In the following description, a normal direction of the dielectric substrate 130 (radiation direction of radio waves) is defined as the Z-axis direction, and the planes perpendicular to the Z-axis direction are defined as the X-axis and the Y-axis. The positive direction of the Z-axis in each figure may be referred to as the upper side and the negative direction as the lower side.

The dielectric substrate 130 has a configuration in which a substrate 1301 is stacked on a substrate 1302. The substrate 1301 and the substrate 1302 have different dielectric constants. The substrate 1301 may be mounted on the substrate 1302 by a solder connection.

Each of the substrates 1301 and 1302 may be, for example, a low temperature co-fired ceramics (LTCC) multilayer substrate, a multilayer resin substrate formed by laminating multiple resin layers composed of epoxy, polyimide, or other resins, a multilayer resin substrate formed by laminating multiple resin layers composed of a liquid crystal polymer (LCP) having a lower dielectric constant, a multilayer resin substrate formed by laminating multiple resin layers composed of fluorine-based resin, a multilayer resin substrate formed by laminating multiple resin layers composed of polyethylene terephthalate (PET) material, or a ceramic multilayer substrate other than LTCC. Each of the substrates 1301 and 1302 does not necessarily have to be a multilayer structure and may be a single-layer substrate.

The substrate 1301 has a rectangular shape when viewed in plan in the normal direction (the Z-axis direction). The radiating element 121 is disposed in a layer close to an upper surface 131 (the positive side of the Z-axis) of the substrate 1301 (the upper side of the substrate 1301). The radiating element 121 may be disposed in a manner that the radiating element 121 is exposed on the surface of the substrate 1301, or the radiating element 121 may be disposed inside the substrate 1301 as illustrated in the example in FIG. 2(B).

The radiating element 121 is a flat plate electrode having a rectangular shape. Radio frequency signals are supplied to the radiating element 121 from the RFIC 110 via the power feeding lines 141 and 142. The power feeding line 141 penetrates the ground electrode GND from the RFIC 110 and is connected to a power feeding point SP1 of the radiating element 121. The power feeding line 142 penetrates the ground electrode GND from the RFIC 110 and is connected to a power feeding point SP2 of the radiating element 121.

The power feeding point SP1 is offset from the center of the radiating element 121 in the negative direction of the X-axis. By supplying a radio frequency signal to the power feeding point SP1, radio waves with the polarization direction in the X-axis direction are radiated from the radiating element 121. The power feeding point SP2 is offset from the center of the radiating element 121 in the positive direction of the Y-axis. By supplying a radio frequency signal to the power feeding point SP2, radio waves with the polarization direction in the Y-axis direction are radiated from the radiating element 121. In other words, the antenna module 100 is a so-called dual-polarization antenna module capable of radiating radio waves in two different polarization directions.

A ground electrode GND is placed across the entire surface of the dielectric substrate 130, close to a lower surface 132 of the substrate 1302. The RFIC 110 is mounted on the lower surface 132 of the substrate 1302 via solder bumps 150. The RFIC 110 may be connected to the substrate 1302 by using a multi-pole connector instead of a solder connection.

In the antenna module 100, the dielectric body 135 is disposed in a wall-like configuration to cover the side surfaces including sides 161 and 162 of the substrate 1301 in the proximity of the power feeding points SP1 and SP2, respectively. In other words, the power feeding line 141 is connected to the radiating element 121 at a position offset from the center of the radiating element 121 in the direction toward the side 161 (in the negative direction of the X-axis), and the dielectric body 135 is disposed so as to cover the side surface including the side 161.

Similarly, the power feeding line 142 is connected to the radiating element 121 at a position offset from the center of the radiating element 121 in the direction toward the side 162 (in the positive direction of the Y-axis), and the dielectric body 135 is disposed so as to cover the side surface including the side 162.

The dielectric body 135 is formed, for example, of ceramic or resin. The dielectric constant of the dielectric body 135 is higher than the dielectric constants of the substrates 1301 and 1302. As an example, the dielectric constant of the substrate 1301 is 4, the dielectric constant of the substrate 1302 is 6, and the dielectric constant of the dielectric body 135 is 10. A distance L1 between the dielectric body 135 and the radiating element 121 is less than ¼ of a dimension L2 of one side of the radiating element 121 ($L1<L2/4$).

In the antenna module having a flat plate-shaped radiating element as described above, an electric field is generated in the polarization direction based on a radio frequency signal being supplied to the power feeding point. Specifically, based on a radio frequency signal being supplied to the power feeding point SP1 of the antenna module 100, an electric field is generated in the X-axis direction, and based on a radio frequency signal being supplied to the power feeding point SP2, an electric field is generated in the Y-axis direction.

Based on a dielectric body with a high dielectric constant being disposed in the lateral direction of the radiating element, the electric field generated by the radiating element in the lateral direction (the X-axis direction, the Y-axis direction) is blocked by the dielectric body and directed to the upper surface side (in the Z-axis direction). As a result, the electric field generated by the radiating element is concentrated in the direction of radiation of the radio waves compared to a case in which no dielectric body is provided, which improves the antenna gain and thereby improves the directivity of the radio wave radiated from the radiating element.

Figure 3:
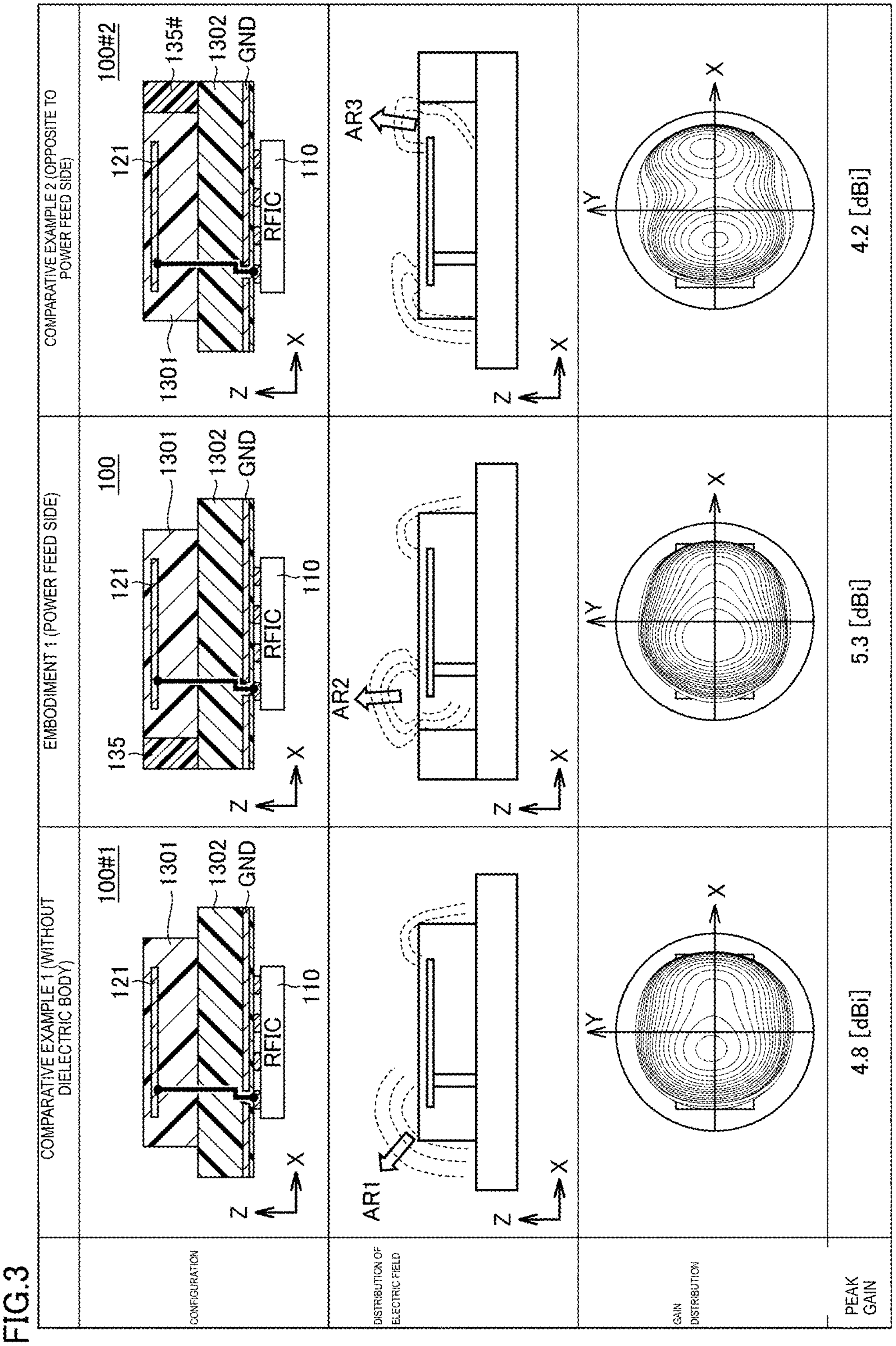
FIG. 3 is a diagram for describing the antenna characteristics according to Embodiment 1 and Comparative Examples.

FIG. 3 is a diagram for explaining simulation results of the antenna characteristics according to Embodiment 1 and Comparative Examples. In FIG. 3, the top row illustrates the schematic configuration of each antenna module, and the second row from the top illustrates a schematic diagram of the distribution of the electric field generated by the radiating element. The third row from the top in FIG. 3 illustrates the gain distribution of each antenna module when the antenna module is viewed in plan view in the Z-axis direction. The bottom row in FIG. 3 illustrates the peak gain of the radio waves radiated from each antenna module. For ease of explanation, the simulation is performed for a case where radio waves with the X-axis as the polarization direction are radiated.

Referring to FIG. 3, an antenna module 100#1 of Comparative Example 1 is configured with the dielectric body 135 in the antenna module 100 excluded. In an antenna module 100#2 of Comparative Example 2, a dielectric body 135# is disposed so as to cover the side in the opposite direction (opposite to the power feed side) of the antenna module 100.

In the antenna module 100#1 of Comparative Example 1 in which no dielectric body is provided, the electric field radiated from the side surface on the power feed side is strong, and the electric field spreads diagonally upward as illustrated by arrow AR1. The gain distribution has a unimodal shape with a peak in the slightly negative direction of the X-axis from the zenith direction (the Z-axis direction), with a peak gain of 4.8 dBi.

In the case of the antenna module 100 according to Embodiment 1, the electric field radiated from the side surface on the power feed side is spread, due to the effect of the dielectric body 135, in the direction of arrow AR2, which is tilted in the Z-axis direction (upward) compared to Comparative Example 1. Accordingly, the peak of the gain distribution has moved further in the zenith direction than in Comparative Example 1, and the peak gain has also increased to 5.3 dBi.

On the other hand, in the antenna module 100#2 of Comparative Example 2, in which the dielectric body 135# is disposed in a direction opposite to the direction in Embodiment 1, the electric field on the opposite side of the power feed side is directed by the dielectric body 135# in the direction of arrow AR3, which is tilted in the Z-axis direction. As a result, the gain distribution has a bimodal shape with peaks in the positive direction and the negative direction of the X-axis rather than in the zenith direction, resulting in deterioration of directivity. The peak gain has also decreased to 4.2 dBi.

As described above, by covering the side surface of the dielectric substrate close to the power feeding point of the radiating element with a dielectric body having a dielectric constant higher than the dielectric constant of the dielectric substrate, the directivity of the antenna gain can be improved as well as the peak gain.

In the antenna module 100 according to Embodiment 1, the configuration of a dielectric body in each polarization direction for a dual-polarization antenna module is described, but the similar configuration can be applied to an antenna module that radiates radio waves in one polarization direction.

The "radiating element 121" in Embodiment 1 corresponds to the "first radiating element" in the present disclosure. The "dielectric body 135" in Embodiment 1 corresponds to the "first dielectric body" in the present disclosure. The "power feeding lines 141 and 142" in Embodiment 1 correspond to the "first power feeding line" and the "second power feeding line" in the present disclosure, respectively. The sides 161 and 162" in Embodiment 1 correspond to the "first side" and the "second side" in the present disclosure, respectively. The "negative direction of the X-axis" and the "positive direction of the Y-axis" in Embodiment 1 correspond to the "first direction" and the "second direction" in the present disclosure, respectively. The "substrates 1301 and 1302" in Embodiment 1 correspond to the "first substrate" and the "second substrate" in the present disclosure, respectively.

(Modification 1)

In the antenna module 100 of Embodiment 1, a configuration in which the dielectric substrate 130 is formed of the substrate 1301 in which the radiating element 121 is provided and the substrate 1302 in which the ground electrode GND is provided has been described, but the dielectric substrate need not necessarily be formed of two different substrates.

Figure 4:
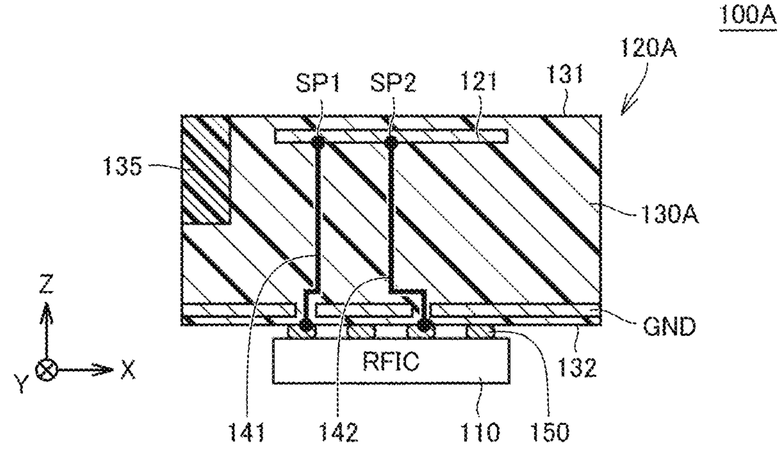
FIG. 4 is a sectional perspective view of an antenna module according to Modification 1.

FIG. 4 is a sectional perspective view of an antenna module 100A of Modification 1. An antenna device 120A in the antenna module 100A of Modification 1 has a configuration in which the radiating element 121 and the ground electrode GND are disposed in a common dielectric substrate 130A. In the dielectric substrate 130A, the dielectric body 135 having a dielectric constant higher than the dielectric constant of the dielectric substrate 130A is disposed on a side surface including a side in the proximity of the power feeding line 141. Although not illustrated in FIG. 4, the dielectric body 135 is also disposed on the side surface including a side in the proximity of the power feeding line 142.

In FIG. 4, the dielectric body 135 is disposed on a portion of the side surface of the dielectric substrate 130A in the Z-axis direction, but it may be disposed on the entire side surface in the Z-axis direction.

As described above, even in a configuration in which the radiating element and the ground electrode are disposed in a common dielectric substrate, the directivity of the antenna gain can be improved as well as the peak gain by covering the side surface of the dielectric substrate close to the power feeding point of the radiating element with a dielectric body having a dielectric constant higher than the dielectric constant of the dielectric substrate.

(Modification 2)

In Modification 2, a configuration in which the position of the radiating element on the dielectric substrate is inclined as compared to Embodiment 1 in FIG. 2 is described.

Figure 5:
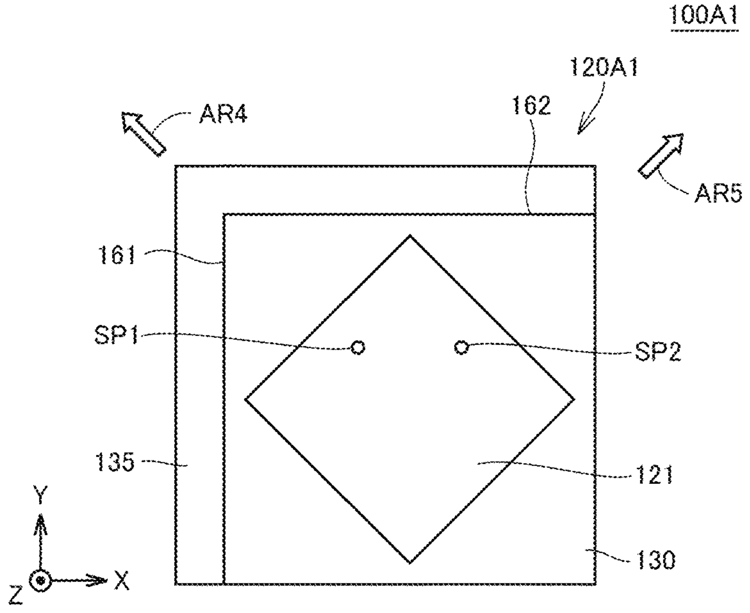
FIG. 5 is a plan view of an antenna module according to Modification 2.

FIG. 5 is a plan view of an antenna module 100A1 of Modification 2.

In an antenna device 120A1 in the antenna module 100A1 of Modification 2, each side of the radiating element 121 is inclined with respect to each side of the dielectric substrate 130. Specifically, in the antenna module 100A1, the radiating element 121 in the antenna module 100 of FIG. 2 is configured to be rotated by 45° clockwise. Other configurations are the same as the configurations in the antenna module 100 of Embodiment 1, and descriptions of overlapping elements will not be repeated.

In this case, the power feeding point SP1 is offset with regard to the center of the radiating element 121 in the direction between the negative direction of the X-axis and the positive direction of the Y-axis. Therefore, based on a radio frequency signal being supplied to the power feeding point SP1, a radio wave with the polarization direction in the direction of arrow AR4 in FIG. 5 is radiated in the positive direction of the Z-axis.

The power feeding point SP2 is offset with regard to the center of the radiating element 121 in the direction between the positive direction of the X-axis and the positive direction of the Y-axis. Therefore, based on a radio frequency signal being supplied to the power feeding point SP2, a radio wave with the polarization direction in the direction of arrow AR5 in FIG. 5 is radiated in the positive direction of the Z-axis.

In the dielectric substrate 130, the side 161 in the negative direction of the X-axis and the side 162 in the positive direction of the Y-axis of the substrate 1301, on which the radiating element 121 is disposed, are covered with the dielectric body 135 like in the antenna module 100 of Embodiment 1.

As described above, even in a configuration in which the radiating element and the power feeding point are disposed at an inclination with respect to the case of Embodiment 1, the directivity of the antenna gain can be improved as well as the peak gain by covering the side surface of the dielectric substrate in the polarization direction with a dielectric body having a dielectric constant higher than the dielectric constant of the dielectric substrate.

In the case of the antenna module 100A1, the dielectric body 135 is partially provided for radio waves with the polarization direction in the direction of arrow AR5. Therefore, the antenna characteristics can be further improved by also disposing the dielectric body 135 on the side in the positive direction of the X-axis of the substrate 1301.

(Modification 3)

In Modification 3, a configuration in which the position of the power feeding point in the radiating element is more inclined than in Embodiment 1 in FIG. 2 is described.

Figure 6:
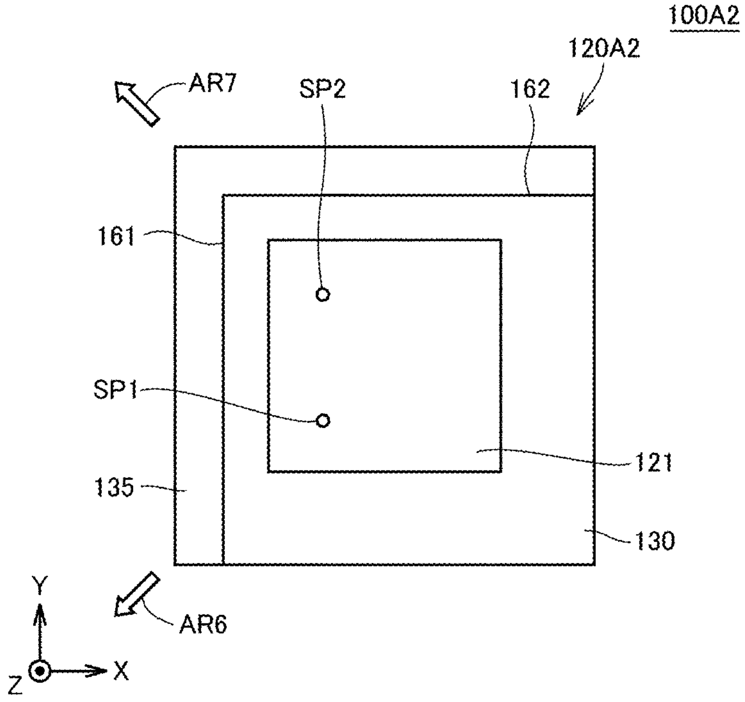
FIG. 6 is a plan view of an antenna module according to Modification 3.

FIG. 6 illustrates a plan view of an antenna module 100A2 according to Modification 3. In an antenna device 120A2 in the antenna module 100A2 of Modification 3, the position of the radiating element 121 is the same as in the case of the antenna module 100 of Embodiment 1, but the power feeding points SP1 and SP2 are disposed in a position rotated counterclockwise by 45° with regard to the center of the radiating element 121 compared to the case of the antenna module 100. The other configurations are the same as the configurations in the antenna module 100 of Embodiment 1, and the description of overlapping elements will not be repeated.

Specifically, the power feeding point SP1 is offset with regard to the center of the radiating element 121 in the direction between the negative direction of the X-axis and the negative direction of the Y-axis. Therefore, based on a radio frequency signal being supplied to the power feeding point SP1, a radio wave with the polarization direction in the direction of arrow AR6 in FIG. 6 is radiated in the positive direction of the Z-axis.

The power feeding point SP2 is offset with regard to the center of the radiating element 121 in the direction between the negative direction of the X-axis and the positive direction of the Y-axis. Therefore, based on a radio frequency signal being supplied to the power feeding point SP2, a radio wave with the polarization direction in the direction of arrow AR7 in FIG. 6 is radiated in the positive direction of the Z-axis.

In the dielectric substrate 130, the dielectric body 135 is disposed on the side 161 in the negative direction of the X-axis and the side 162 in the positive direction of the Y-axis of the substrate 1301 like in the antenna module 100 of Embodiment 1.

As described above, even in a configuration in which the power feeding point is disposed at a rotated position with regard to the center of the dielectric substrate, the directivity of the antenna gain can be improved as well as the peak gain by covering the side surface of the dielectric substrate in the polarization direction with a dielectric body having a dielectric constant higher than the dielectric constant of the dielectric substrate.

In the case of the antenna module 100A2, the dielectric body 135 is partially provided for radio waves with polarization direction in the direction of arrow AR6. Therefore, the antenna characteristics can be further improved by also disposing the dielectric body 135 on the side in the negative direction of the Y-axis of the substrate 1301.

(Modification 4)

In Modification 4, a configuration will be described in which, like in Modification 2, the position of the radiating element is inclined with respect to the dielectric substrate, but the polarization direction of the radiated radio waves is parallel or orthogonal to each side of the dielectric substrate.

Figure 7:
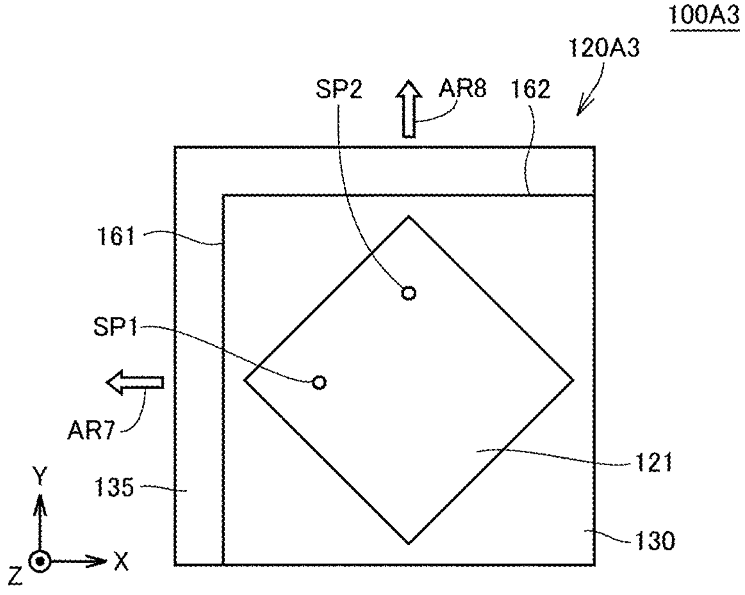
FIG. 7 is a plan view of an antenna module according to Modification 4.

FIG. 7 is a plan view of an antenna module 100A3 of Modification 4. In an antenna device 120A3 in the antenna module 100A3 of Modification 4, each side of the radiating element 121 is configured to be inclined with respect to each side of the dielectric substrate 130. Specifically, in the antenna module 100A3, the radiating element 121 in the antenna module 100 of FIG. 2 is configured to be rotated by 45° in a clockwise direction.

On the other hand, the power feeding points SP1 and SP2, as in the case of the antenna module 100 of Embodiment 1, are disposed such that radio waves with polarization directions in the X-axis and Y-axis directions are radiated. Specifically, the power feeding point SP1 is positioned offset from the center of the radiating element 121 in the negative direction of the X-axis. Therefore, based on a radio frequency signal being supplied to the power feeding point SP1, radio waves with the polarization direction in the X-axis direction (i.e., the direction of arrow AR7 in FIG. 7) is radiated in the positive direction of the Z-axis.

The power feeding point SP2 is disposed offset from the center of the radiating element 121 in the positive direction of the Y-axis. Therefore, based on a radio frequency signal being supplied to the power feeding point SP2, radio waves with the polarization direction in the Y-axis direction (i.e., the direction of arrow AR8 in FIG. 7) are radiated in the positive direction of the Z-axis.

The dielectric body 135 is disposed on the side 161 in the negative direction of the X-axis and the side 162 in the positive direction of the Y-axis of the substrate 1301 in the dielectric substrate 130, like in the antenna module 100 of Embodiment 1.

As described above, even in a configuration in which the radiating element is positioned in a rotated position with regard to the center of the dielectric substrate, the directivity of the antenna gain can be improved as well as the peak gain by covering the side surface of the dielectric substrate in the polarization direction with a dielectric body having a dielectric constant higher than the dielectric constant of the dielectric substrate.

Embodiment 2

In Embodiment 2, a configuration is described in which a dielectric body having a dielectric constant higher than the dielectric constant of the dielectric substrate is disposed on the upper surface of the dielectric substrate in addition to the side surface of the dielectric substrate.

Figure 8:
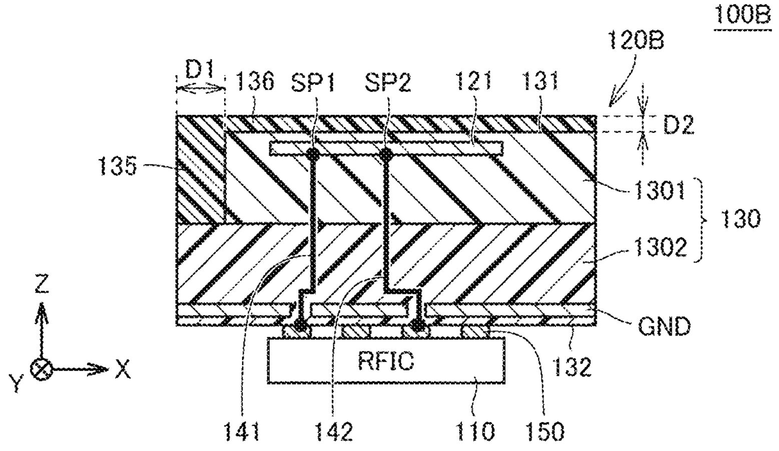
FIG. 8 is a sectional perspective view of an antenna module according to Embodiment 2.

FIG. 8 is a sectional perspective view of an antenna module 100B according to Embodiment 2. An antenna device 120B in the antenna module 100B has a configuration in which a dielectric body 136 is disposed over the entire upper surface 131 of the dielectric substrate 130 (i.e., the upper surface of the substrate 1301) in the antenna module 100 of Embodiment 1. In FIG. 8, the description of elements that overlap those in FIG. 2 will not be repeated.

The dielectric body 136 has a dielectric constant higher than the dielectric constant of the substrate 1301, similar to the dielectric body 135 disposed on the side surface of substrate 1301. The dielectric body 136 may be formed of the same material as the dielectric body 135 or of a different material. The dimension D2 of the dielectric body 136 in the Z-axis direction is smaller than the dimension D1 of the dielectric body 135 in the X-axis direction (D1>D2).

Generally, based on the top of the radiating element being covered with a dielectric layer with a dielectric constant higher than the dielectric constant of the dielectric substrate, the surface acoustic waves generated in the radiating element tend to become stronger. Based on the surface acoustic waves generated in the radiating element becoming stronger, the electric lines of force (electric field) generated from the end portion of the radiating element in the direction along the electrode surface will propagate farther than when there is no dielectric layer with a high dielectric constant. Then, the path length of the electric lines of force from the radiating element to the ground electrode becomes longer, which is equivalent to a longer distance between the radiating element and the ground electrode as a result. Therefore, covering the top of the radiating electrode with a dielectric layer having a high dielectric constant reduces the Q-factor of the patch antenna, resulting in an increased frequency band width.

On the other hand, if a thickness of the dielectric layer covering the top is large, radio waves radiated from the radiating elements may have more difficulty to pass through, and the gain of radio waves radiated from the antenna module may instead decrease. Therefore, by making the dimension D2 of the dielectric body 136 in the Z-axis direction covering the top smaller than the dimension D1 of the dielectric body 135 in the X-axis direction covering the side surface, the frequency band width can be expanded while the gain reduction is suppressed.

Figure 9:
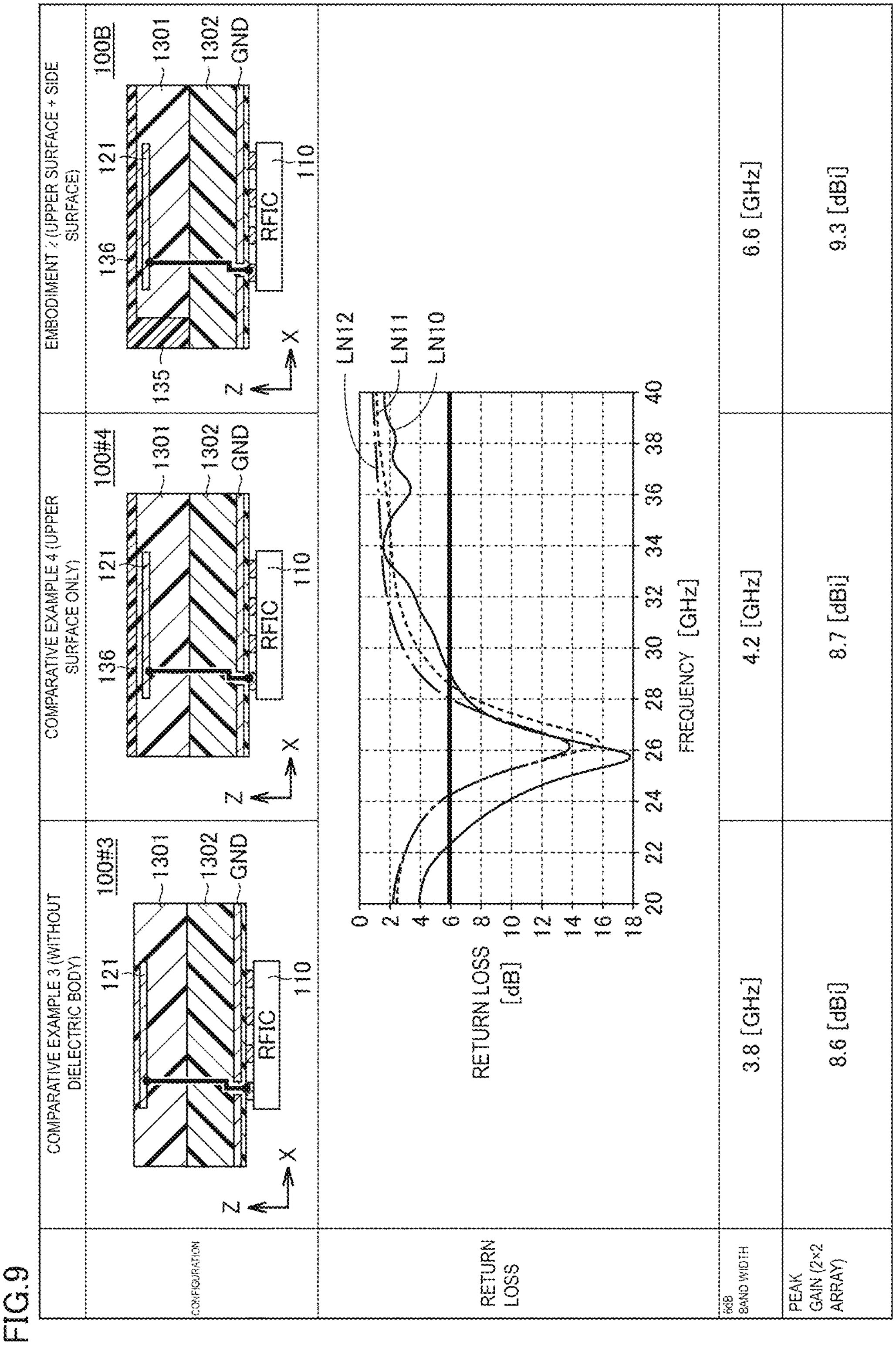
FIG. 9 is a diagram for describing the antenna characteristics according to Embodiment 2 and Comparative Examples.

FIG. 9 is a diagram for describing simulation results of the antenna characteristics of Embodiment 2 and Comparative Examples. In FIG. 9, the top row illustrates the schematic configuration of each antenna module, and the second row from the top illustrates the return loss in each antenna module. The third row from the top in FIG. 9 illustrates the frequency band width where return loss of 6 dB or less is achieved. The bottom row in FIG. 9 illustrates the peak gain based on the radiating elements being disposed in a 2×2 array in the configuration of Embodiment 2 and each Modification. For ease of explanation, the simulation is performed for a case where radio waves with the X-axis as the polarization direction are radiated.

Referring to FIG. 9, an antenna module 100#3 of Comparative Example 3 is configured without the dielectric body 135 or 136. An antenna module 100#4 of Comparative Example 4 is configured with the dielectric body 136 on the upper surface and no dielectric body 135 on the side surface.

In the antenna module 100#3 of Comparative Example 3, the frequency band width is 3.8 GHz and the peak gain is 8.6 dBi, while in the antenna module 100#4 of Comparative Example 4, the frequency band width is 4.2 GHz and the peak gain is 8.7 dBi. Thus, it can be understood that the frequency band width is expanded by disposing the dielectric body 136 on the upper surface.

On the other hand, in the antenna module 100B of Embodiment 2, in which the dielectric body 135 is also disposed on the side surface, the frequency band width is expanded to 6.6 GHz and the peak gain is also improved to 9.3 dBi. The improvement in peak gain is considered to be due to the fact that the electric field from the radiating element 121 to the radiation direction (the Z-axis direction) is strengthened by the dielectric body 135 disposed on the side surface of the substrate 1301, as explained in Embodiment 1.

As for the frequency band width, it is considered that this is further improved by the fact that the electric field collected in the radiation direction by the dielectric body 135, as described above, is sent far away by the action of the surface acoustic wave caused by the dielectric body 136.

As described above, the directivity of the antenna gain and the peak gain can be improved and the frequency band width can be increased by covering the side surface of the dielectric substrate close to the power feeding point of the radiating element and the upper surface in the radiation direction of the radio waves in the dielectric substrate with a dielectric body having a dielectric constant higher than the dielectric constant of the dielectric substrate.

In FIG. 8 of Embodiment 2, a configuration in which one radiating element is disposed is described. However, in the dielectric substrate 130, when viewed in plan in the normal direction, another radiating element disposed so as to overlap the radiating element 121 may be provided between the radiating element 121 and the dielectric body 136. In this case, the other radiating element may be a non-feeding element provided to expand the frequency band width, or may be a feeding element capable of radiating radio waves in a frequency band different from the frequency band of the radiating element 121. By disposing another such radiating element in the substrate 1301, the same effects of improved directivity and peak gain as well as a wider broadband can be achieved as with the radiating element 121.

Electrodes may be disposed while being spaced apart from each other along the sides of the radiating element 121 when viewed in plan in the normal direction of the dielectric substrate 130. By disposing such electrodes, the frequency band width can be expanded. The electrodes may be disposed at the same position as the radiating element 121 in the normal direction of the dielectric substrate 130, or may be disposed between the radiating element 121 and the dielectric body 136.

The "dielectric body 136" in Embodiment 2 corresponds to the "second dielectric body" in the present disclosure.

Embodiment 3

In Embodiment 3 and subsequent Modifications 5 to 7, examples are described in which the features of the present disclosure are applied to an array antenna in which a plurality of radiating elements are disposed on a dielectric substrate.

Figure 10:
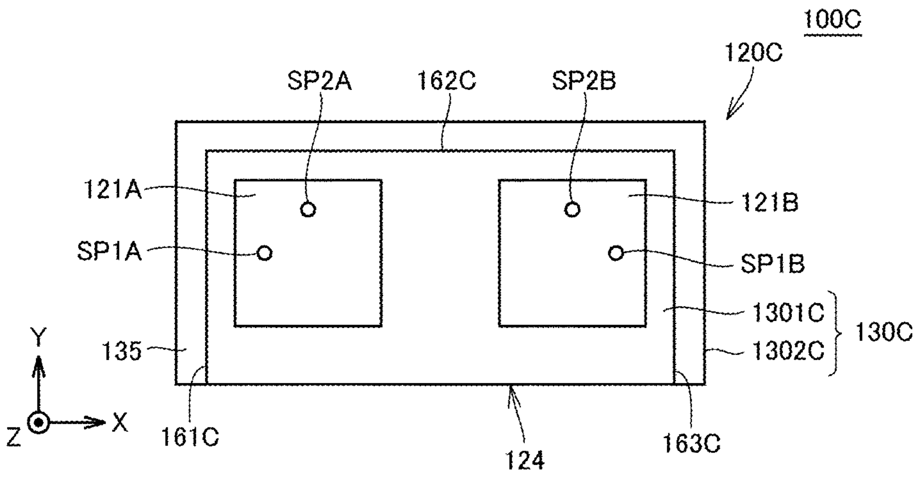
FIG. 10 is a plan view of an antenna module according to Embodiment 3.

FIG. 10 is a plan view of an antenna module 100C according to Embodiment 3. An antenna device 120C of the antenna module 100C in FIG. 10 includes a dielectric substrate 130C, two radiating elements 121A and 121B, and the dielectric body 135.

The dielectric substrate 130C, like in the antenna module 100 of the Embodiment 1, includes a substrate 1302C and a substrate 1301C disposed on the substrate 1302C. On the substrate 1301C, radiating elements 121A and 121B are disposed adjacent to each other in the X-axis direction. In other words, the antenna module 100C is a 1×2 array antenna. The substrate 1301C and the radiating elements 121A and 121B form a subarray 124.

The radiating element 121A is disposed in the negative direction of the X-axis with regard to the center of the substrate 1301C. The radiating element 121A is supplied with a radio frequency signal at power feeding points SP1A and SP2A. The power feeding point SP1A is disposed offset from the center of the radiating element 121A in the negative direction of the X-axis, and the power feeding point SP2A is disposed offset from the center of the radiating element 121A in the positive direction of the Y-axis.

The radiating element 121B is disposed in the positive direction of the X-axis with regard to the center of substrate 1301C. The radiating element 121B is supplied with a radio frequency signal at power feeding points SP1B and SP2B. The power feeding point SP1B is disposed offset from the center of the radiating element 121B in the positive direction of the X-axis, and the power feeding point SP2B is disposed offset from the center of the radiating element 121B in the positive direction of the Y-axis.

In addition, the dielectric body 135 having a dielectric constant higher than the dielectric constant of the dielectric substrate 130C is disposed on the side surface of the substrate 1301C including a side 161C in the proximity of the power feeding point SP1A, a side 162C in the proximity of the power feeding points SP2A and SP2B, and a side 163C in the proximity of the power feeding point SP1B.

In the antenna module 100C as well, by configuring the substrate 1301C forming the subarray 124 with the dielectric body 135 having a high dielectric constant on the side surface including the side in the proximity of each power feeding point, the directivity and the peak gain of each of the radiating elements 121A and 121B can be improved, thereby improving the directivity and the peak gain of the entire antenna module 100C.

Although not illustrated in FIG. 10, the frequency band of the antenna module 100C can be expanded by disposing a dielectric body having a dielectric constant higher than the dielectric constant of the dielectric substrate 130C on the upper surface of the dielectric substrate 130C, as in Embodiment 2.

The "radiating elements 121A and 121B" in Embodiment 3 correspond to the "first radiating element" and the "second radiating element" in the present disclosure, respectively. The "sides 161C, 162C, and 163C" in Embodiment 3 correspond to the "first side", the "second side", and the "third side" in the present disclosure, respectively. The "negative direction of the X-axis", the "positive direction of the Y-axis", and the "positive direction of the X-axis" in Embodiment 3 correspond to the "first direction", the "second direction", and the "third direction" in the present disclosure, respectively.

(Modification 5)

In Modification 5, an example is described in which the features of the present disclosure are applied to an array antenna in which four radiating elements are disposed in a 2×2 two-dimensional array.

Figure 11:
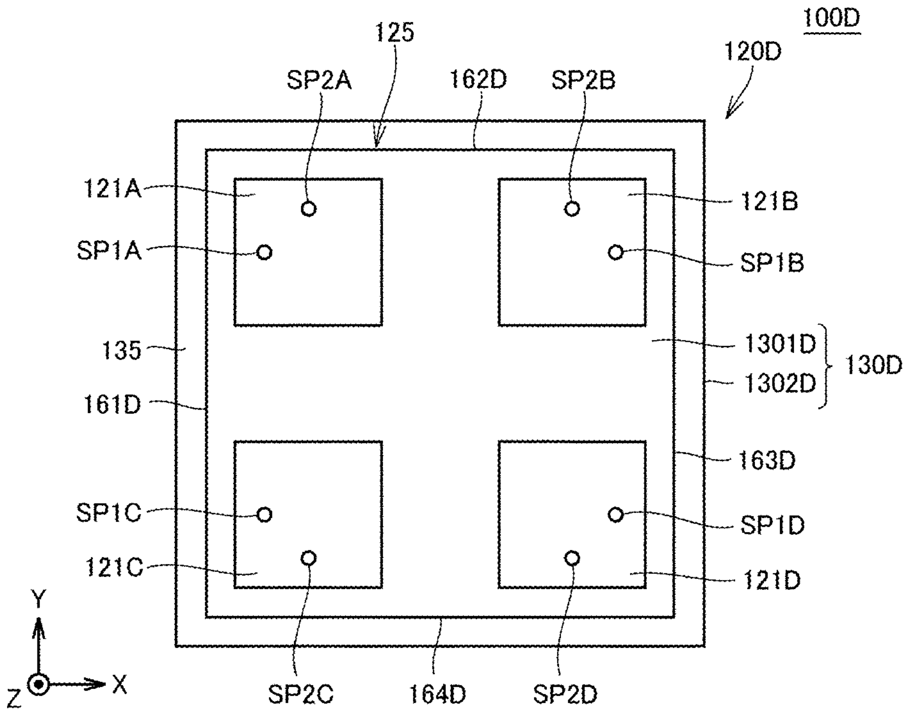
FIG. 11 is a plan view of an antenna module according to Modification 5.

FIG. 11 is a plan view of an antenna module 100D according to Modification 5. An antenna device 120D of the antenna module 100D includes a dielectric substrate 130D, four radiating elements 121A to 121D, and the dielectric body 135.

The dielectric substrate 130D includes a substrate 1302D having an approximately square planar shape and a substrate 1301D disposed on the substrate 1302D. On the substrate 1301D, the four radiating elements 121A to 121D are disposed in a 2×2 two-dimensional array. The substrate 1301D and the radiating elements 121A to 121D form a subarray 125.

The substrate 1301D has four sides 161D, 162D, 163D, and 164D. The side 161D is a side in the negative direction of the X-axis in the substrate 1301D, and the radiating elements 121A and 121C are disposed along the side 161D. The side 162D is a side in the positive direction of the Y-axis in the substrate 1301D, and the radiating elements 121A and 121B are disposed along the side 162D. The side 163D is a side in the positive direction of the X-axis in the substrate 1301D, and the radiating elements 121B and 121D are disposed along the side 163D. The side 164D is a side in the negative direction of the Y-axis in the substrate 1301D, and the radiating elements 121C and 121D are disposed along the side 164D.

The radiating element 121A is supplied with radio frequency signals at the power feeding points SP1A and SP2A. The power feeding point SP1A is disposed offset from the center of the radiating element 121A in the negative direction of the X-axis, and the power feeding point SP2A is disposed offset from the center of the radiating element 121A in the positive direction of the Y-axis. Radio frequency signals are supplied to the radiating element 121B at the power feeding points SP1B and SP2B. The power feeding point SP1B is disposed offset from the center of the radiating element 121B in the positive direction of the X-axis, and the power feeding point SP2B is disposed offset from the center of the radiating element 121B in the positive direction of the Y-axis.

The radiating element 121C is supplied with radio frequency signals at power feeding points SP1C and SP2C. The power feeding point SP1C is disposed offset from the center of the radiating element 121C in the negative direction of the X-axis, and the power feeding point SP2C is disposed offset from the center of the radiating element 121A in the negative direction of the Y-axis. Radio frequency signals are supplied to the radiating element 121D at power feeding points SP1D and SP2D. The power feeding point SP1D is disposed offset from the center of the radiating element 121D in the positive direction of the X-axis, and the power feeding point SP2D is disposed offset from the center of the radiating element 121D in the negative direction of the Y-axis.

In addition, in the substrate 1301D, on the side surfaces including the side 161D in the proximity of the power feeding points SP1A and SP1C, the side 162D in the proximity of the power feeding points SP2A and SP2B, the side 163D in the proximity of the power feeding points SP1B and SP1D, and the side 164D in the proximity of the power feeding points SP2C and SP2D, the dielectric body 135 having a dielectric constant higher than the dielectric constant of the dielectric substrate 130C is disposed. In other words, in the antenna module 100D, the dielectric body 135 is disposed so as to cover the side surfaces surrounding the substrate 1301D.

Thus, by disposing the dielectric body 135 with a high dielectric constant on the side surfaces surrounding the subarray 125 in which the four radiating elements 121A to 121D are disposed in a two-dimensional array, the directivity and the peak gain for each of the radiating elements 121A to 121D are improved, thereby improving the directivity and the peak gain for the entire antenna module 100D.

In addition, with regard to the antenna module 100D, the frequency band of the antenna module 100D can be expanded by further disposing a dielectric body having a dielectric constant higher than the dielectric constant of the substrate 1301D on the upper surface of the substrate 1301D.

The "radiating elements 121A to 121D" in Modification 5 correspond to the "first radiating element", the "second radiating element", the "third radiating element", and the "fourth radiating element" in the present disclosure, respectively. The "sides 161D to 164D" in Modification 5 correspond to the "first side", the "second side", the "third side", and the "fourth side" in the present disclosure, respectively. The "negative direction of the X-axis", the "positive direction of the Y-axis", the "positive direction of the X-axis", and the "negative direction of the Y-axis" in Modification 5 correspond to the "first direction", the "second direction", the "third direction", and the "fourth direction" in the present disclosure, respectively.

(Modification 6)

In Modification 6, a configuration of an array antenna with two subarrays of four radiating elements disposed in a 2×2 two-dimensional array adjacent to each other is described.

Figure 12:
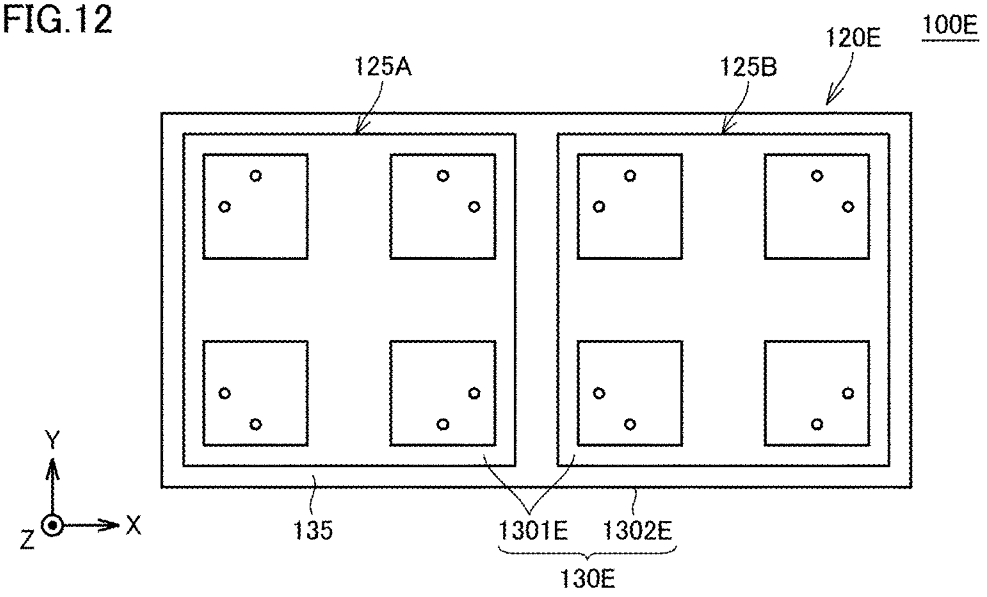
FIG. 12 is a plan view of an antenna module according to Modification 6.

FIG. 12 illustrates a plan view of an antenna module 100E of Modification 6. An antenna device 120E in the antenna module 100E includes a rectangular dielectric substrate 130E, two subarrays 125A and 125B disposed adjacent to each other in the X-axis direction, and the dielectric body 135.

The dielectric substrate 130E includes a rectangular substrate 1302E and an approximately square substrate 1301E forming each of the subarrays 125A and 125B. Each of the subarrays 125A and 125B has a configuration similar to the subarray 125 described in Modification 5 of FIG. 11, with the four radiating elements disposed in a 2×2 two-dimensional array on each substrate 1301E. The power feeding point in each radiating element is disposed offset from the center of the radiating element in the direction of a side in the proximity in the substrate 1301E.

In addition, the dielectric body 135 having a dielectric constant higher than the dielectric constant of the substrate 1301E is disposed so as to cover the side surfaces surrounding the substrate 1301E in each of the subarrays 125A and 125B. Therefore, the directivity and the peak gain of each radiating element are improved, and thus the directivity and the peak gain of each of the subarrays 125A and 125B and the entire antenna module 100E can be improved. Also, with regard to the antenna module 100E, the frequency band of the antenna module 100E can be expanded by further disposing a dielectric body having a dielectric constant higher than the dielectric constant of the substrate 1301E on the upper surface of the substrate 1301E.

(Modification 7)

In Modification 7, a configuration of an array antenna is described in which subarrays of four radiating elements are further disposed in a 2×2 two-dimensional array.

Figure 13:
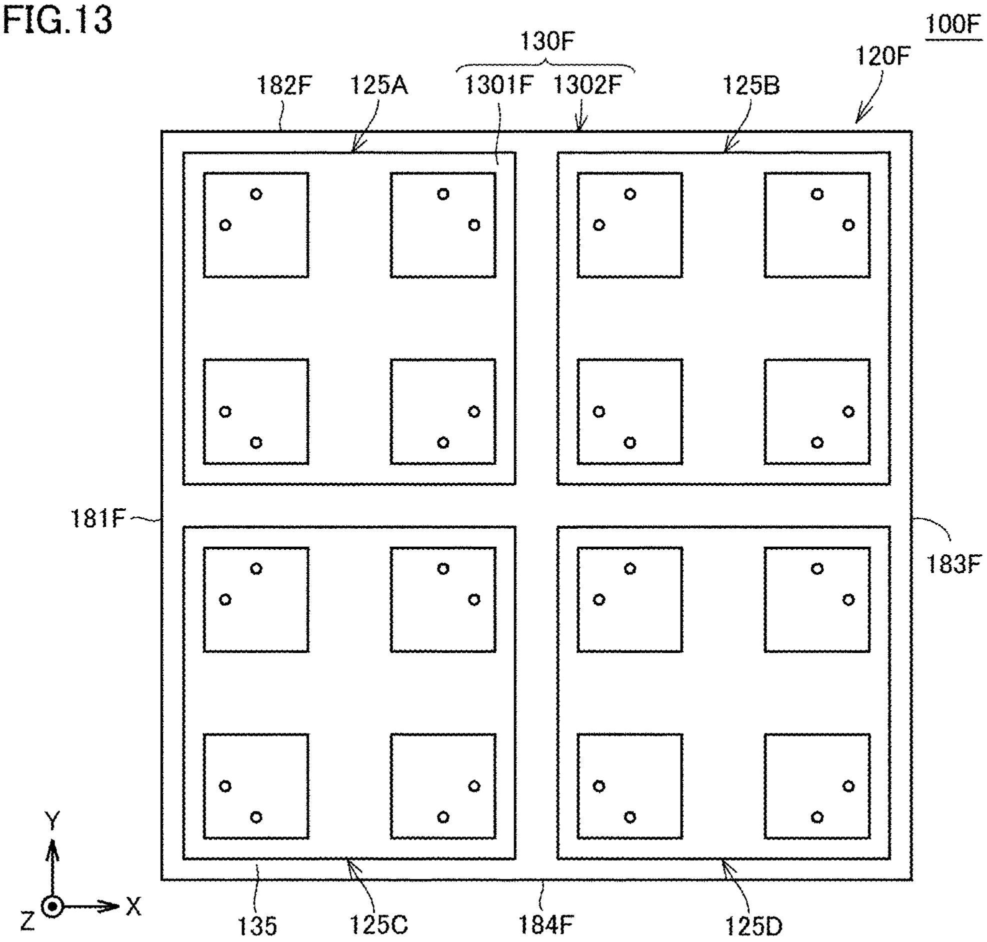
FIG. 13 is a plan view of an antenna module according to Modification 7.

FIG. 13 illustrates a plan view of an antenna module 100F of Modification 7. An antenna device 120F in the antenna module 100F includes a dielectric substrate 130F, four subarrays 125A to 125D, and the dielectric body 135.

The dielectric substrate 130F includes a substrate 1302F having an approximately square shape and an approximately square substrate 1301F forming each of the subarrays 125A to 125D. Each of the subarrays 125A to 125D has a configuration similar to the subarray 125 described in Modification 5 of FIG. 11, with the four radiating elements disposed in a 2×2 two-dimensional array on each substrate 1301F.

The subarrays 125A to 125D are disposed in a 2×2 array on the substrate 1301F. More particularly, the subarrays 125A and 125C are disposed adjacent to each other along a side 181F along the Y-axis direction of the substrate 1302F, and the subarrays 125A and 125B are disposed adjacent to each other along a side 182F along the X-axis direction of the substrate 1302F. The subarrays 125B and 125D are disposed adjacent to each other along a side 183F along the Y-axis direction of the substrate 1302F, and the subarrays 125C and 125D are disposed adjacent to each other along a side 184F along the X-axis direction of the substrate 1302F. In the radiating elements of each subarray, the power feeding points are disposed offset from the center of each radiating element in the direction of the side in the proximity in the substrate 1301F.

In addition, the dielectric body 135 having a dielectric constant higher than the dielectric constant of the substrate 1301F is disposed so as to cover the side surfaces surrounding the substrate 1301F in each of the subarrays 125A to 125D.

Also, in the antenna module in this configuration, the directivity and the peak gain of each radiating element in each subarray are improved by the dielectric body 135, thereby improving the directivity and the peak gain of each of the subarrays 125A to 125D and the entire antenna module 100F. Also, with regard to the antenna module 100F, the frequency band of the antenna module 100F can be expanded by further disposing a dielectric body having a dielectric constant higher than the dielectric constant of the substrate 1301F on the upper surface of the substrate 1301F.

Embodiment 4

In Embodiment 4 and the following Modification 8 and Modification 9, a configuration is described in which two substrates constituting a dielectric substrate are spaced apart from each other.

Figure 14:
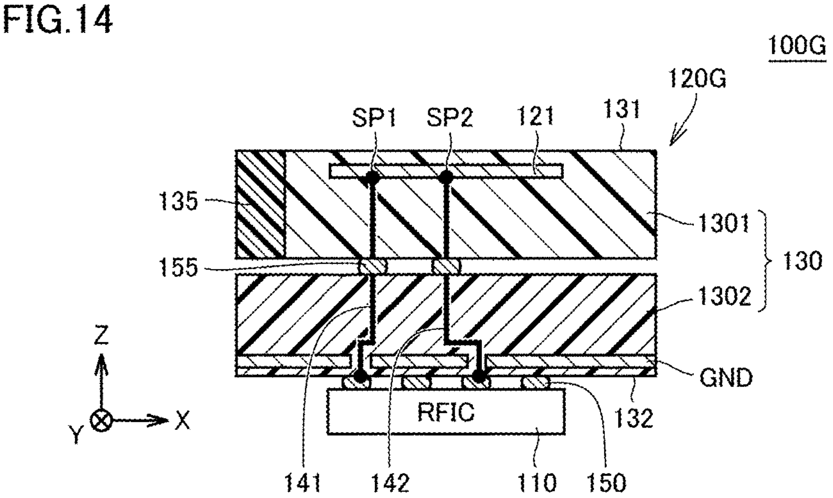
FIG. 14 is a sectional perspective view of an antenna module according to Embodiment 4.

FIG. 14 is a sectional perspective view of an antenna module 100G according to Embodiment 4. In an antenna device 120G in the antenna module 100G, the substrates 1301 and 1302 in the dielectric substrate 130 are spaced apart from each other. The power feeding lines 141 and 142 extend from the substrate 1302 to the substrate 1301 via solder bumps 155 disposed between the substrate 1301 and the substrate 1302.

The disposition of the radiating element 121 in the substrate 1301 and the disposition of the power feeding points SP1 and SP2 in the radiating element 121 are the same as in the antenna module 100 of Embodiment 1. The side surface of the substrate 1301 close to the power feeding points SP1 and SP2 is covered with the dielectric body 135 having a dielectric constant higher than the dielectric constant of the dielectric substrate 130.

Thus, even in a configuration in which the substrate in which the radiating element is disposed and the substrate in which the ground electrode is disposed are spaced apart from each other in the dielectric substrate, the directivity of the antenna gain can be improved as well as the peak gain by covering the side surface of the dielectric substrate close to the power feeding point of the radiating element with a dielectric body having a dielectric constant higher than the dielectric constant of the dielectric substrate.

(Modification 8)

In Modification 8, in a configuration in which two substrates constituting a dielectric substrate are spaced apart from each other, as in Embodiment 4, a configuration is described in which the substrate, in which the radiating element is disposed, is formed by a core and a prepreg.

Figure 15:
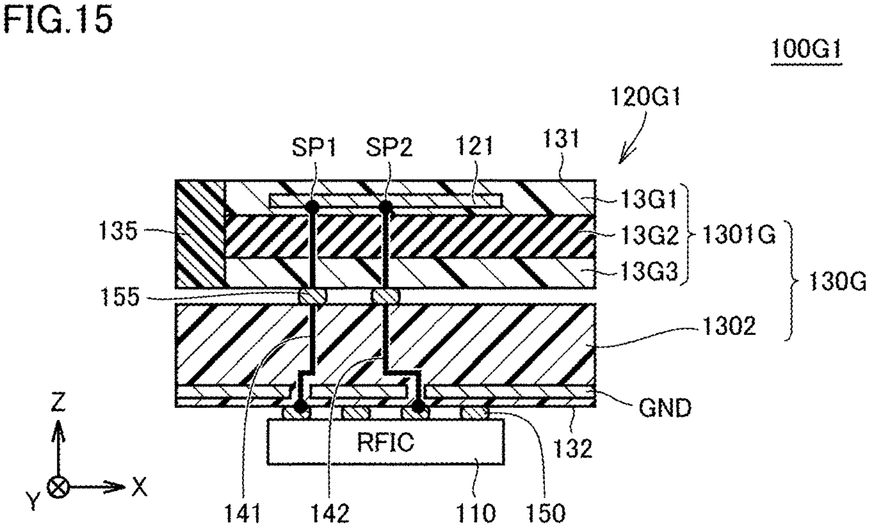
FIG. 15 is a sectional perspective view of an antenna module according to Modification 8.

FIG. 15 is a sectional perspective view of an antenna module 100G1 of Modification 8. In an antenna device 120G1 in the antenna module 100G1, a dielectric substrate 130G includes a substrate 1301G in which the radiating element 121 is formed and a substrate 1302 in which the ground electrode GND is formed.

The substrate 1301G is composed of a layer forming a core 13G2 and layers forming prepregs 13G1 and 13G3 disposed on the upper and lower surfaces of the core 13G2, respectively.

The core 13G2 is formed by performing heat processing on a material made of glass cloth woven with highly insulating glass fibers and impregnated with resin. The core 13G2 is typically glass epoxy (FR4), but can also be formed of polyimide, polyester, or polytetrafluoroethylene (PTFE). The prepregs 13G1 and 13G3 are insulating materials made by impregnating glass cloth with resin and curing it to a semi-cured state, and are basically formed from materials similar to the core.

The radiating element 121 is disposed in a layer of the prepreg 13G1. In the substrate 1301G, the power feeding lines 141 and 142 penetrate the prepreg 13G3 and the core 13G2 and are connected to the radiating element 121 disposed in the prepreg 13G1.

The disposition of the radiating element 121 in the prepreg 13G1 of the substrate 1301G and the disposition of the power feeding points SP1 and SP2 in the radiating element 121 are the same as in the antenna module 100 of Embodiment 1. The side surface of the substrate 1301G close to the power feeding points SP1 and SP2 is covered with the dielectric body 135 having a dielectric constant higher than the dielectric constant of the dielectric substrate 130. The dielectric body 135 should be disposed so as to cover at least the side surface of the prepreg 13G1 where the radiating element 121 is disposed.

Thus, even in a configuration in which the substrate in which the radiating element is disposed is formed by a multilayer structure with a core sandwiched between the prepregs, the directivity of the antenna gain can be improved as well as the peak gain by covering the side surface of the dielectric substrate close to the power feeding point of the radiating elements with a dielectric body having a dielectric constant higher than the dielectric constant of the dielectric substrate.

(Modification 9)

In Modification 9, in a configuration in which two substrates constituting a dielectric substrate are spaced apart from each other as in Embodiment 4, the entire substrate in which the radiating element is disposed is molded in a dielectric body having a dielectric constant higher than the dielectric constant of the dielectric substrate.

Figure 16:
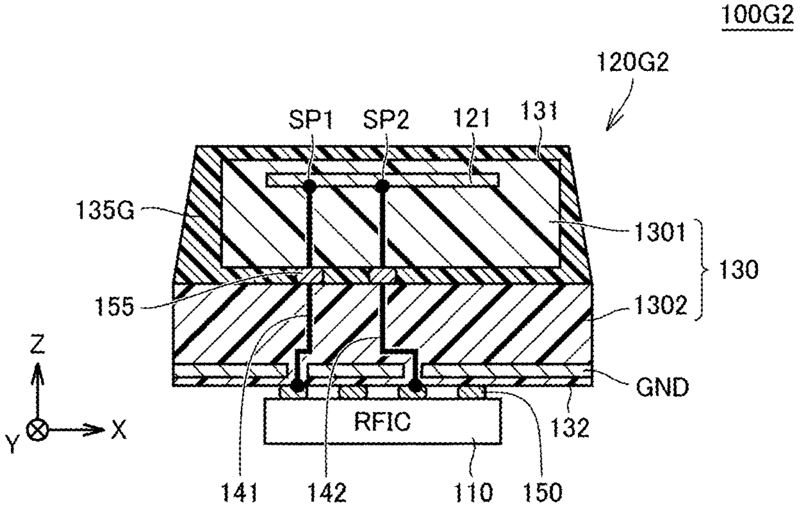
FIG. 16 is a sectional perspective view of an antenna module according to Modification 9.

FIG. 16 is a sectional perspective view of an antenna module 100G2 of Modification 9. In an antenna device 120G2 in the antenna module 100G2, as in the antenna module 100G of Embodiment 4, the substrate 1301 in which the radiating element 121 is formed and the substrate 1302 in which a ground electrode GND is formed are spaced apart from each other, and the power feeding lines 141 and 142 are extended between the substrates via the solder bumps 155.

The disposition of the radiating element 121 in the substrate 1301 and the disposition of the power feeding points SP1 and SP2 in the radiating element 121 are the same as in the antenna module 100 of Embodiment 1. The perimeter of the substrate 1301 is molded in a dielectric body 135G having a dielectric body with a dielectric constant higher than the dielectric constant of the dielectric substrate 130. The dielectric body 135G does not need to disposed in the portion between the substrate 1301 and the substrate 1302.

Thus, by molding the substrate in which the radiating element is disposed in a dielectric body having a dielectric constant higher than the dielectric constant of the dielectric substrate, the dielectric body can cover the side surface of the dielectric substrate close to the power feeding point of the radiating element. This improves the directivity of the antenna gain as well as the peak gain.

The embodiments disclosed herein should be considered exemplary and not restrictive in all respects. The scope of the invention is indicated by the claims, not by the description of the above-described embodiments, and is intended to include all modifications within the meaning and scope equivalent to the claims.

REFERENCE SIGNS LIST

- 10 Communication Device
- 13G1, 13G3 Prepreg
- 13G2 Core
- 100, 100A to 100G, 100A1 to 100A3, 100G1, 100G2 Antenna Module
- 110 RFIC
- 111A to 111H, 113A to 113H, 117A, 117B Switch
- 112AR to 112HR Low-Noise Amplifier
- 112AT to 112HT Power Amplifier
- 114A to 114H Attenuator
- 115A to 115H Phase Shifter
- 116A, 116B Signal Multiplexer/Demultiplexer
- 118A, 118B Mixer
- 119A, 119B Amplifier Circuit
- 120, 120A to 120G, 120A1 to 120A3, 120G1, 120G2 Antenna Device
- 121, 121A to 121D Radiating Element
- 124, 125, 125A to 125D Subarray
- 130, 130A to 130G Dielectric Substrate
- 135, 135G, 136 Dielectric Body
- 141, 142 Power Feeding Line
- 150, 155 Solder Bump
- 161, 162, 161C to 163C, 161D to 164D, 181F to 184F Side
- 1301, 1301C to 1301G, 1302, 1302C to 1302F Substrate
- 200 BBIC
- GND Ground Electrode
- SP1, SPLA to SP1D, SP2, SP2A to SP2D Power Feeding POINT

The invention claimed is:

1. An antenna module, comprising:

a dielectric substrate having a rectangular shape including a first side and a second side adjacent to each other;

a first radiating element disposed in or on the dielectric substrate;

a first power feeding line extending in a normal direction of the dielectric substrate and transferring a radio frequency signal supplied from a power feed circuit to the first radiating element; and a first dielectric body disposed on a side surface of the dielectric substrate, wherein the first power feeding line is coupled to the first radiating element at a position offset from a center of the first radiating element in a first direction toward the first side, the first dielectric body is disposed so as to cover the side surface including on a feeding side, which is the first side of the dielectric substrate, a dielectric constant of the first dielectric body is higher than a dielectric constant of the dielectric substrate.

2. The antenna module according to claim 1, further comprising:

a second dielectric body disposed on an upper surface of the dielectric substrate so as to cover the first radiating element when viewed in plan in the normal direction of the dielectric substrate, wherein a dielectric constant of the second dielectric body is higher than the dielectric constant of the dielectric substrate.

3. The antenna module according to claim 2, wherein a dimension of the second dielectric body in the normal direction is smaller than a dimension of the first dielectric body in the first direction.

4. The antenna module according to claim 3, wherein a distance between the first radiating element and the first dielectric body, when viewed in plan in the normal direction of the dielectric substrate, is shorter than ¼ of a dimension of the first radiating element in the first direction.

5. The antenna module according to claim 4, further comprising:

a ground electrode disposed opposite to the first radiating element in the dielectric substrate, wherein the dielectric substrate includes a first substrate in or on which the first radiating element is disposed, and a second substrate in which the ground electrode is disposed, and the first dielectric body is disposed so as to cover at least a side surface of the first substrate.

6. The antenna module according to claim 5, further comprising:

a second power feeding line extending in the normal direction of the dielectric substrate and transferring a radio frequency signal supplied from the power feed circuit to the first radiating element, wherein the second power feeding line is coupled to the first radiating element at a position offset from the center of the first radiating element in a second direction toward the second side, and the first dielectric body is disposed so as to further cover a side surface including the second side of the dielectric substrate.

7. The antenna module according to claim 6, comprising:

a second radiating element disposed adjacent to the first radiating element in a third direction opposite to the first direction in or on the dielectric substrate, wherein the dielectric substrate further includes a third side opposite to the first side, in the second radiating element, a radio frequency signal is supplied to a position offset from a center of the second radiating element in the third direction, and to a position offset from the center of the second radiating element in the second direction, and the first dielectric body is disposed so as to further cover a side surface including the third side of the dielectric substrate.

8. The antenna module according to claim 7, wherein the dielectric substrate further includes a fourth side opposite to the second side, the antenna module further comprises:

a third radiating element disposed adjacent to the first radiating element in a fourth direction opposite to the second direction in or on the dielectric substrate; and a fourth radiating element disposed adjacent to the second radiating element in the fourth direction in or on the dielectric substrate, in the third radiating element, a radio frequency signal is supplied to a position offset from a center of the third radiating element in the first direction, and to a position offset from the center of the third radiating element in the fourth direction, in the fourth radiating element, a radio frequency signal is supplied to a position offset from a center of the fourth radiating element in the third direction, and to a position offset from the center of the fourth radiating element in the fourth direction, and the first dielectric body is disposed so as to further cover a side surface including the fourth side of the dielectric substrate.

9. The antenna module according to claim 8, further comprising:

the power feed circuit.

10. A communication device, comprising:

the antenna module according to claim 9.

11. The antenna module according to claim 1, wherein the first dielectric body is disposed externally on the side surface of the dielectric substrate, the side surface being on a feeding side toward which the first power feeding line is offset from the center of the first radiating element, and the first dielectric body guides an electric field radiated from the first radiating element in the normal direction of the dielectric substrate toward the feeding side.

12. An antenna module comprising:

a support substrate;

a plurality of subarrays disposed on the support substrate; and a dielectric body covering the plurality of subarrays, wherein, each of the plurality of subarrays is provided with a dielectric substrate having a rectangular shape having a first side to a fourth side, and a first radiating element to a fourth radiating element that are disposed in or on the dielectric substrate, the second side and the fourth side extend in a first direction, the first side and the third side extend in a second direction orthogonal to the first direction, the first radiating element and the second radiating element are disposed adjacent to each other in the first direction along the second side, the first radiating element and the third radiating element are disposed adjacent to each other in the second direction along the first side, the second radiating element and the fourth radiating element are disposed adjacent to each other in the first direction along the fourth side, the third radiating element and the fourth radiating element are disposed adjacent to each other in the second direction along the third side, in each of the first radiating element to the fourth radiating element, a radio frequency signal is supplied to a position offset from a center of the radiating element in a direction of a side in proximity in the dielectric substrate, the dielectric body includes a first dielectric body disposed so as to cover a side surface including the first side to the fourth side adjacent to the feed point in each of the plurality of subarrays, and a second dielectric body disposed so as to cover the first radiating element to the fourth radiating element in each of the plurality of subarrays, when viewed in plan in a normal direction of the dielectric substrate, and a dielectric constant of the dielectric body is higher than a dielectric constant of the dielectric substrate.

13. The antenna module according to claim 12, further comprising:

a power feed circuit that supplies a radio frequency signal to each radiating element.

14. A communication device equipped with the antenna module according to claim 13.

15. The antenna module according to claim 12, wherein a distance between the first radiating element and the first dielectric body, when viewed in plan in the normal direction of the dielectric substrate, is shorter than ¼ of a dimension of the first radiating element in the first direction.

16. The antenna module according to claim 15, further comprising:

a ground electrode disposed opposite to the first radiating element in the dielectric substrate, wherein the dielectric substrate includes a first substrate in or on which the first radiating element is disposed, and a second substrate in which the ground electrode is disposed, and the first dielectric body is disposed so as to cover at least a side surface of the first substrate.

17. The antenna module according to claim 16, further comprising:

a second power feeding line extending in the normal direction of the dielectric substrate and transferring a radio frequency signal supplied from the power feed circuit to the first radiating element, wherein the second power feeding line is coupled to the first radiating element at a position offset from the center of the first radiating element in a second direction toward the second side, and the first dielectric body is disposed so as to further cover a side surface including the second side of the dielectric substrate.

18. The antenna module according to claim 17, comprising:

a second radiating element disposed adjacent to the first radiating element in a third direction opposite to the first direction in or on the dielectric substrate, wherein the dielectric substrate further includes a third side opposite to the first side, in the second radiating element, a radio frequency signal is supplied to a position offset from a center of the second radiating element in the third direction, and to a position offset from the center of the second radiating element in the second direction, and the first dielectric body is disposed so as to further cover a side surface including the third side of the dielectric substrate.

19. The antenna module according to claim 18, wherein in the third radiating element, a radio frequency signal is supplied to a position offset from a center of the third radiating element in the first direction, and to a position offset from the center of the third radiating element in the fourth direction, in the fourth radiating element, a radio frequency signal is supplied to a position offset from a center of the fourth radiating element in the third direction, and to a position offset from the center of the fourth radiating element in the fourth direction, and the first dielectric body is disposed so as to further cover a side surface including the fourth side of the dielectric substrate.

20. The antenna module according to claim 12, wherein the first dielectric body is disposed externally on a side surface of the dielectric substrate, the side surface being adjacent to a feed point at which a radio frequency signal is supplied to each of the plurality of subarrays, and the first dielectric body guides an electric field radiated from the radiating elements in the normal direction of the dielectric substrate.

* * * * *